Patented Feb. 21, 1928.

1,660,213

UNITED STATES PATENT OFFICE.

MERWYN C. TEAGUE, OF JACKSON HEIGHTS, NEW YORK, ASSIGNOR TO AMERICAN RUBBER COMPANY, OF BOSTON, MASSACHUSETTS, A CORPORATION OF MASSACHUSETTS.

METHOD OF COLORING AQUEOUS DISPERSIONS OF RUBBER AND PRODUCTS OBTAINED THEREBY.

No Drawing.   Application filed March 31, 1925.   Serial No. 19,734.

This invention relates to methods of coloring aqueous dispersions of rubber and to products obtained thereby.

The art of producing colored aqueous dispersions of rubber has hitherto been limited to the use of coloring materials of two descriptions, one of which is soluble in the rubber dispersion, and the other of which imparts color only through its pigmentary properties. The soluble type of coloring material is limited to those colors or dyes which are soluble in water. The coloring materials of the second category are limited to the so-called mineral pigments which must be added in quantities sufficient to color the entire mass of rubber dispersion, and for this reason must be regarded more as compounding or filling ingredients. The efficiency of such insoluble pigmentary materials is dependent entirely upon the extent to which they can be kept in suspension and in even distribution until the dispersion has been used and reduced to a permanent condition by drying or coagulating.

The present invention relates to methods of coloring aqueous rubber dispersions, either natural or artificial, with coloring materials which are insoluble in water, but are soluble in an organic solvent which can be evenly distributed in aqueous dispersion and this constitutes one of the objects of the invention. Another object of the invention is to provide a method of coloring rubber dispersions by dissolving coloring materials in an organic solvent and distributing this solution in the aqueous dispersion of rubber and maintaining an even distribution therein by the use of an emulsifying agent. A still further object of the invention is to provide a method for distributing a solution of an organic coloring material in an oil and maintaining an even distribution of the solution in the aqueous dispersion of rubber by the addition of a polar compound.

With a particular embodiment in mind but without intention to limit the scope of the invention beyond what may be required by the prior art, the invention broadly stated consists in dissolving an oil soluble coloring material in an oil, the interfacial tension of which with an aqueous dispersion of rubber has been decreased by supplying an additional chemical group and evenly distributing the oil solution of the coloring material in an aqueous dispersion of rubber.

The invention may be carried out as follows: An oil soluble dye such as oil soluble nigrosine is dissolved in an organic solvent such as castor oil or preferably sulphonated castor oil. The oil solution may then be emulsified in the aqueous dispersion of rubber, either with or without an additional emulsifying and/or protective agent.

The emulsification of the dye solution in the rubber dispersion is facilitated by the addition of a polar compound to the dye solution. A polar compound is understood to be a chemical compound which acts as a bridge between two relatively immiscible liquids. Sulphonated castor oil is an example of a satisfactory polar compound which may be used in this instance. Instead of this, other sulphonated or chlorinated oils, or orthotoluidine, sodium sulphanilate, thiourea, sodium salicylate, ammonium (or sodium or potassium) linoleate or similar soap, saponin, sodium naphthalene sulphonate and other compounds having similar properties may be employed.

Still another method of carrying out the present invention is as follows: The coloring material is dissolved in sulphonated castor oil and the solution then mixed with the aqueous dispersion of rubber. The effect of the sulphonated treatment is to increase the polarity of the castor oil, whereupon it can be distributed in the rubber dispersion much more readily.

The process of the invention is not limited to the coloring material or the oil mentioned above, for other dyes and other solvents may be employed with equal facility. The emulsifying agent or the polar compound may also be varied.

Having thus described my invention, what I claim and desire to protect by Letters Patent is:

1. A method of coloring aqueous dispersions of rubber which consists in dissolving a water insoluble dye in a solvent and emulsifying the solution in an aqueous dispersion of rubber.

2. A method of coloring aqueous dispersions of rubber which consists in forming a solution of an oil soluble dye in an oil, emulsifying the solution, and distributing the emulsion in an aqueous dispersion of rubber.

3. A method of coloring aqueous dispersions of rubber which consists in dissolving an oil soluble dye in an oil the interfacial tension of which with respect to aqueous dispersions of rubber has first been decreased by the addition of a polar compound thereto, emulsifying the solution, and distributing the emulsion in an aqueous dispersion of rubber.

4. A method of coloring aqueous dispersions of rubber which consists in dissolving an oil soluble dye in a sulphonated oil, emulsifying the solution, and distributing said solution uniformly throughout an aqueous dispersion of rubber.

5. A method of coloring aqueous dispersions of rubber which consists in dissolving an oil soluble dye in sulphonated castor oil, forming a water emulsion of said solution, and adding the emulsion to a rubber latex.

MERWYN C. TEAGUE.